(12) United States Patent
Ogata et al.

(10) Patent No.: US 8,903,603 B2
(45) Date of Patent: Dec. 2, 2014

(54) ENVIRONMENT RECOGNIZING DEVICE FOR A VEHICLE AND VEHICLE CONTROL SYSTEM USING THE SAME

(75) Inventors: Takehito Ogata, Hitachi (JP); Shoji Muramatsu, Hitachinaka (JP); Takashi Tsutsui, Atsugi (JP); Katsuyuki Nakamura, Saitama (JP); Mitsutoshi Morinaga, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 373 days.

(21) Appl. No.: 13/545,849

(22) Filed: Jul. 10, 2012

(65) Prior Publication Data
US 2013/0018547 A1 Jan. 17, 2013

(30) Foreign Application Priority Data
Jul. 11, 2011 (JP) .................................. 2011-152776

(51) Int. Cl.
| | | |
|---|---|---|
| G06F 7/00 | (2006.01) |
| G06K 9/00 | (2006.01) |
| B60K 35/00 | (2006.01) |
| G01C 21/26 | (2006.01) |
| B60R 16/03 | (2006.01) |
| B60R 16/023 | (2006.01) |
| B60K 37/06 | (2006.01) |

(52) U.S. Cl.
CPC .............. G06K 9/00825 (2013.01); *B60K 35/00* (2013.01); *G01C 21/26* (2013.01); *B60R 16/0315* (2013.01); *B60R 16/0231* (2013.01); *B60K 37/06* (2013.01)
USPC .............. 701/36; 701/439; 701/408; 701/459

(58) Field of Classification Search
CPC ........ B60K 37/06; B60K 35/00; G01C 21/26; B60R 16/0315; B60R 16/0231
USPC .......... 701/533, 301, 80, 36, 1; 340/435, 436, 340/903; 382/104, 103; 700/215, 214, 213; 704/246, 275, 233; 374/E7.042; 73/105; 348/345
See application file for complete search history.

(56) References Cited

U.S. PATENT DOCUMENTS 6,137,531 A 10/2000 Kanzaki et al.
2002/0010537 A1* 1/2002 Yamaguchi et al. ............ 701/80
(Continued)

FOREIGN PATENT DOCUMENTS

CA 2341823 A1 3/2000
CN 101470730 A 7/2009
(Continued)

OTHER PUBLICATIONS

Japanese Office Action with English translation thereof Dated Jun. 11, 2013 {Seven (7) Pages}.
(Continued)

*Primary Examiner* — Behrang Badii
(74) *Attorney, Agent, or Firm* — Crowell & Moring LLP

(57) ABSTRACT

An environment recognizing device for a vehicle is provided that can correctly detect a preceding vehicle in a scene, such as for instance the dusk, which is under an illumination condition different from that in the daytime. The device detects a vehicle external shape while detecting vehicle taillights, and determines a region in which the vehicle external shape and the vehicle taillights move in synchronization, as a vehicle.

11 Claims, 15 Drawing Sheets

(56) References Cited

U.S. PATENT DOCUMENTS

| | | |
|---|---|---|
| 2005/0033517 A1* | 2/2005 | Kondoh et al. ............... 701/301 |
| 2006/0140449 A1 | 6/2006 | Otsuka et al. |
| 2008/0069400 A1 | 3/2008 | Zhu et al. |
| 2011/0001615 A1 | 1/2011 | Kuoch et al. |
| 2013/0289874 A1* | 10/2013 | Taguchi ........................ 701/533 |

FOREIGN PATENT DOCUMENTS

| | | |
|---|---|---|
| CN | 101673403 A | 3/2010 |
| EP | 2 275 971 A1 | 1/2011 |
| JP | 10-255019 A | 9/1998 |
| JP | 10-289393 A | 10/1998 |
| JP | 2002-56494 A | 2/2002 |
| JP | 2003-521752 A | 7/2003 |
| JP | 2005-121601 A | 5/2005 |
| JP | 2006-182086 A | 7/2006 |
| JP | 2006-244331 A | 9/2006 |
| JP | 2009-177311 A | 8/2009 |
| JP | 2009-282592 A | 12/2009 |
| JP | 2010-264912 A | 11/2010 |
| JP | 2011-87037 A | 4/2011 |

OTHER PUBLICATIONS

European Search Report dated May 27, 2014 (three (3) pages).

David Sanotos et al., "Car Recognition Based on Back Lights and Rear View Features", Image Analysis for Multimedia Interactive Services, 2009, WIAMIS, IEEE, pp. 137-140.

Jin Li-Sheng et al., "Preceding Vehicle Detection Based on Multi-Characteristics Fusion", Vehicular Electronics and Safety, 2006, IEEE International Conference, pp. 356-360.

Chinese Office Action dated Mar. 20, 2014 with English Translation (seven (7) pages).

* cited by examiner

Y image     UV image
(a)

| | Illumination | | |
|---|---|---|---|
| | Low | Slightly low | High |
| Actual situation | Night | Dusk, in tunnel | Daytime |
| Selection | Without output | VCL2 | VCL1 |

ENVIRONMENT RECOGNIZING DEVICE FOR A VEHICLE AND VEHICLE CONTROL SYSTEM USING THE SAME

BACKGROUND OF THE INVENTION

1. Field of the Invention

The present invention relates to an environment recognizing device for a vehicle, and a vehicle control system using the same. For instance, the present invention relates to an environment recognizing device for a vehicle that detects a vehicle or a pedestrian in front of the own vehicle on the basis of image information from a vehicle-mounted camera (imaging device), and a vehicle control system using the same.

2. Background Art

To reduce the toll of casualties due to traffic accidents, preventive safety systems for preventing accidents have been developed. The preventive safety systems operate under situations with a high possibility of causing accidents. For instance, a pre-crash safety system and the like have been put into practical use. For instance, this system warns a driver with an alarm when a possibility of collision with a preceding vehicle in front of the own vehicle occurs. In a situation where a collision is unavoidable, this system reduces damage to an occupant by automatically braking.

As a method of detecting a preceding vehicle in front of the own vehicle, a method has been known that takes an image in front of the own vehicle by a camera, and detects a shape pattern of the vehicle from the taken image according to a pattern matching process. The pattern matching process typically has a high processing load. Thus, in order to reduce the processing load, it is typical to perform edge analysis before the pattern matching process, narrow down a region in which a vehicle is likely to exist, and then perform the pattern matching process. For instance, JP Patent Publication (Kokai) No. 2006-182086 A (2006) describes a method that detects a vehicle candidate from an edge of an image, and determines that the object is a preceding vehicle according to a pattern matching.

Meanwhile, as another method of detecting a preceding vehicle in front of the own vehicle, a method has been known that extracts red regions characterizing the taillights of the preceding vehicle, and detects the vehicle using the red pair. For instance, JP Patent Publication (Kokai) No. 2006-244331 A (2006) discloses a method that extracts a luminance signal having at least a prescribed threshold from an image, and detects the taillights of the preceding vehicle from positional relationship and the like.

In the above techniques for detecting a vehicle, the former has an object to control an alarm, brake and the like. Accordingly, erroneous detections in scenes without risk of collision in actuality are required to be reduced as much as possible. The latter has an object to automatically adjust an own vehicle's lighting device in order to improve visibility of the own vehicle in the night. Accordingly, the latter has erroneous detections more than the former.

SUMMARY OF THE INVENTION

However, according to the methods, it is difficult to control the alarm, brake and the like in places, such as the dusk, a tunnel and an urban area in the night, which are dusky and under an illumination condition different from that in the daytime.

In the former technique, the vehicle patterns are different from those in the daytime. Accordingly, the pattern matching tuned to the daytime has a low detection rate. In contrast, adjustment allowing both vehicle patterns in the daytime and dusky scenes reduces an accuracy of detecting a vehicle pattern in the daytime.

The latter technique can detect a vehicle with its lights on in a dusky scene. However, this technique has many erroneous detections, as described above. Accordingly, it is difficult to use this technique for controlling an alarm, brake and the like.

The present invention has been made in view of the above situations. It is an object of the present invention to provide an environment recognizing device for a vehicle capable of correctly detecting a preceding vehicle in a scene, such as in the dusk, with an illumination condition different from that in the daytime.

In order to achieve the objects, an environment recognizing device for a vehicle according to the present invention basically includes: an image acquisition section for acquiring an image taken around an own vehicle; a first vehicle candidate region detection section for detecting a vehicle candidate region from the image using image gradient information; a second vehicle candidate region detection section for detecting a vehicle candidate region from the image using image color information; and a vehicle determination section for determining presence or absence of a vehicle using the first vehicle candidate region and the second vehicle candidate region, wherein the vehicle determination section determines a region in which the first vehicle candidate region and the second vehicle candidate region overlap with each other and move in synchronization, as a vehicle.

The present invention can acquire a vehicle detection result having few erroneous detections in places, such as the dusk, a tunnel and an urban area in the night, which are dusky and under an illumination condition different from that in the daytime, thereby allowing appropriate control of an alarm, brake and the like even in such scenes.

Problems, configurations and advantageous effects other than those described above will be apparent according to following embodiments.

BRIEF DESCRIPTION OF THE DRAWINGS

FIG. 6 is a diagram showing an example of a table used by the determination and selection section in the first embodiment.

DETAILED DESCRIPTION OF THE PREFERRED EMBODIMENTS

Embodiments of the present invention will now be described with reference to drawings.

Figure 1:
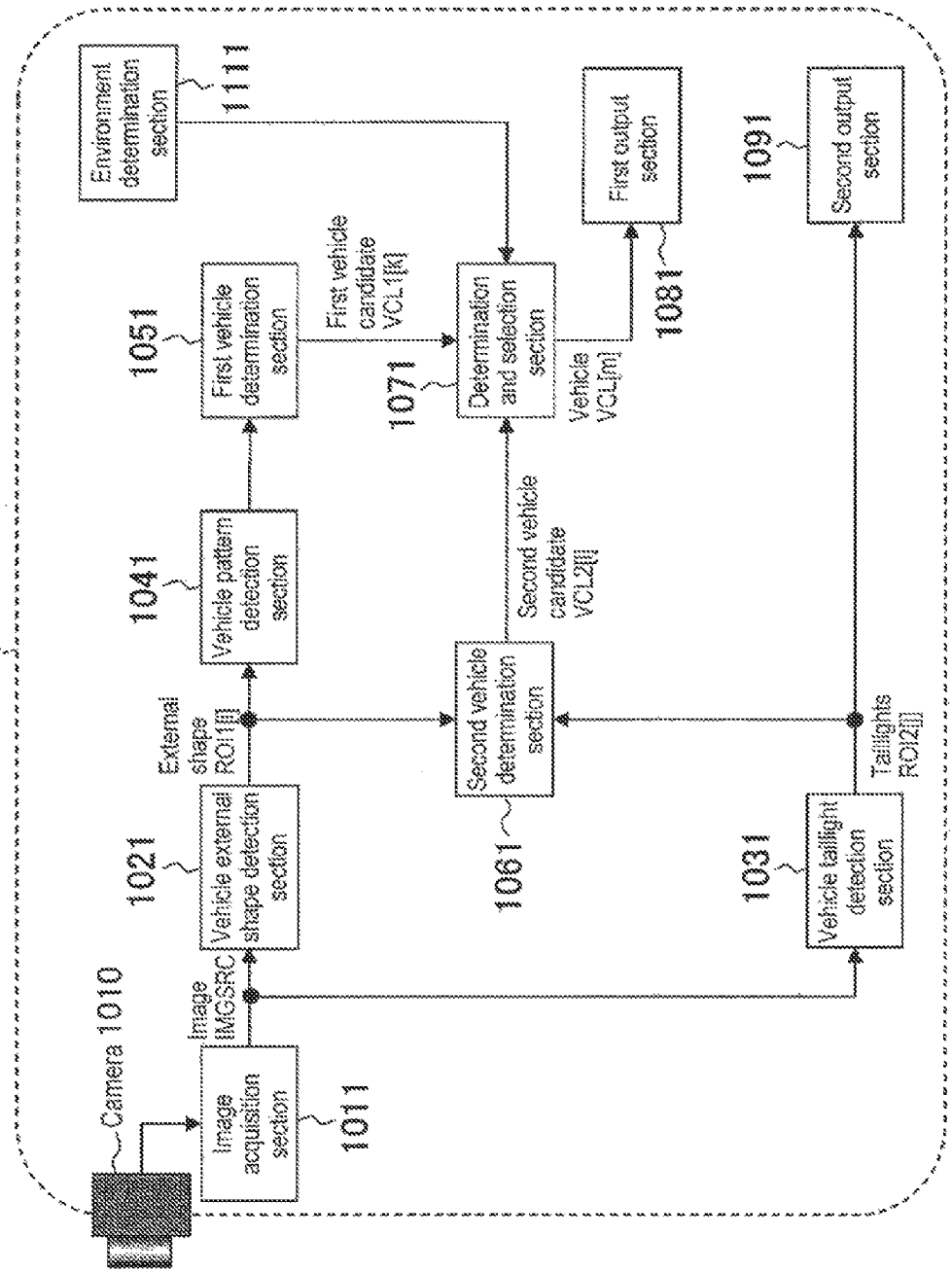
FIG. 1 is a functional block diagram showing a first embodiment of an environment recognizing device for a vehicle according to the present invention.

FIG. 1 is a functional block diagram showing an embodiment (first embodiment) of an environment recognizing device for a vehicle according to the present invention.

First Embodiment

The environment recognizing device for a vehicle 1000 shown in the diagram is embedded in a vehicle-mounted camera 1010, an integrated controller or the like, and for detecting a vehicle from an image taken by the camera 1010. In this embodiment, this device is configured so as to detect a preceding vehicle from a taken image in front of the own vehicle.

The environment recognizing device for a vehicle 1000 includes a main part, which is a computer having a CPU, memory and I/O. Prescribed processes and procedures are programmed therein. This device repeatedly executes the processes at a predetermined period.

As shown in FIG. 1, the environment recognizing device for a vehicle 1000 of the first embodiment includes the image acquisition section 1011, the vehicle external shape detection section 1021, the vehicle taillight detection section 1031, the vehicle pattern detection section 1041, the first vehicle determination section 1051, the second vehicle determination section 1061, the determination and selection section 1071, the first output section 1081, and the second output section 1091. In some embodiments, this device further includes the environment determination section 1111.

The image acquisition section 1011 captures image data including an image in front of the own vehicle from the camera 1010 installed at a position capable of taking an image in front of the own vehicle, and writes the data as an image IMGSRC[c][x][y] in a RAM. The image IMGSRC[c][x][y] is a two-dimensional array, where c represents color information, and x and y represent coordinates of the image. The format of the color information may be any color format, such as a YUV format or a RGB format. For instance, in the case of the YUV format, c=0 represents a Y image, and c=1 represents a UV image. For instance, in the case of the RGB format, c=0 represents a red component, c=1 represents a green component, and c=2 represents a blue component. Hereinafter, this embodiment adopts the YUV format.

The vehicle external shape detection section 1021 detects a vehicle external shape ROI1[i](SX, SY, EX, EY) from the image IMGSRC[c][x][y]. Here, i is an ID number in the case of detecting a plurality of external shapes. The details of the process will be described later.

The vehicle taillight detection section 1031 detects a vehicle taillight ROI2[j](SX, SY, EX, EY) from the image IMGSRC[c][x][y]. Here, j is an ID number in the case of detecting a plurality of taillights. The details of the process will be described later.

The vehicle pattern detection section 1041 executes pattern recognition on the vehicle external shape ROI1[i](SX, SY, EX, EY). The result thereof is used by the first vehicle determination section 1051. This embodiment determines presence or absence of a rear pattern of a vehicle. The details of the pattern recognition process will be described later.

The first vehicle determination section 1051 outputs a first vehicle candidate VCL1[k](SX, SY, EX, EY) using the result of the vehicle pattern detection section 1041. Here, k is an ID number in the case of detecting a plurality of vehicles.

The second vehicle determination section 1061 executes a process on an overlapping region of the vehicle external shape ROI1[i] and the vehicle taillight ROI2[j], and outputs a second vehicle candidate VCL2[l]. Here, l is an ID number in the case of detecting a plurality of vehicles. The details of the process will be described later.

The determination and selection section 1071 outputs a detected vehicle VCL[m] according to the first vehicle candidate VCL1[k] and the second vehicle candidate VCL2[l]. In some embodiments, the process is changed according to the environment determination section 1111. Here, m is an ID number in the case of detecting a plurality of vehicles. The details of the process will be described later.

The first output section 1081 outputs information of the detected vehicle VCL[m] to another process or another device. The output may be coordinates on the image, or a physical position of the vehicle (distance, lateral position) calculated using a camera geometric model. The output may be directly send from the environment recognizing device for a vehicle 1000 via a signal line, or through communication using an LAN (local area network).

The second output section 1091 outputs information of the vehicle taillight ROI2[j] to another process or another device. The output may be coordinates on the image, or the physical position of the vehicle (distance, lateral position) calculated using the camera geometric model. The output may be directly send from the environment recognizing device for a vehicle 1000 via the signal line, or through communication using LAN.

The environment determination section 1111, which exists in some embodiments, measures an illumination around the own vehicle. The illumination may be measured by processing the image IMGSRC, or received from another sensor equipped to the own vehicle.

In the case of processing the image IMGSRC, for instance, a process is executed as follows. A region where a road surface is captured in the camera image is set on the basis of parameters, such as angles preset at the time of installation of the camera, and the camera geometry. The average value of luminances in the set region is acquired. According to this value, it can be understood that the ambient area is dark when the value is low, and the ambient area is bright when the value is high.

In the case of reception from another sensor, a signal may be input directly to the environment recognizing device for a vehicle 1000, or acquired through communication using LAN. The result of the environment determination section 1111 is used by the determination and selection section 1071.

[Vehicle External Shape Detection Section 1021]

Figure 2:
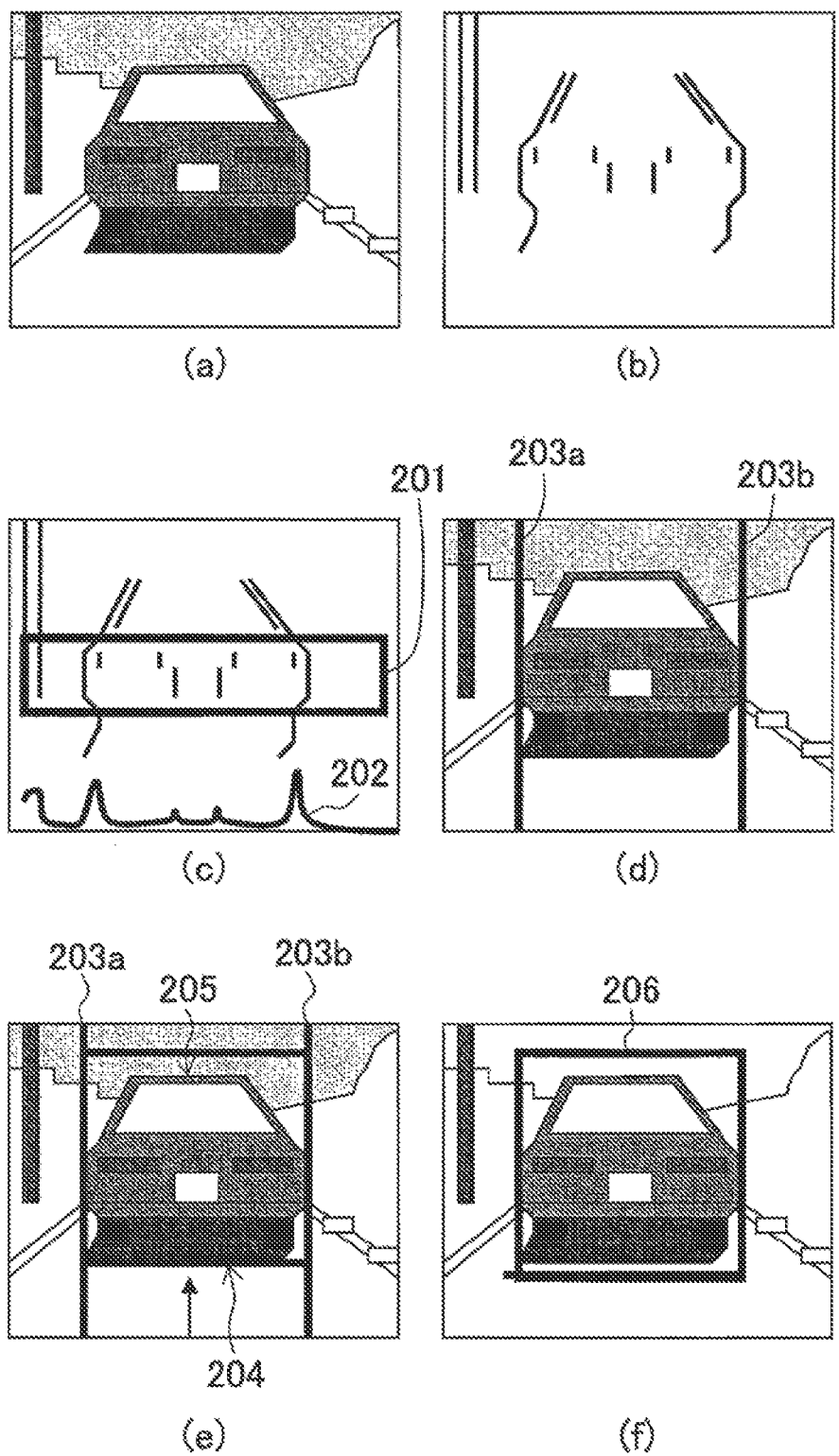
FIG. 2 is a schematic diagram used for describing the vehicle external shape detection section in the first embodiment.

Next, referring to FIG. 2, the details of the process of the vehicle external shape detection section 1021 will be described. FIG. 2 shows an example of a process executed by the vehicle external shape detection section 1021.

A method of detecting edges in the vertical direction on both sides of a vehicle and a method of detecting horizontal edges of the vehicle have been known as methods of detecting a vehicle external shape.

FIG. 2 is a diagram for illustrating a method of identifying a vehicle candidate region in the image data. FIG. 2(*a*) shows a Y component of the image IMGSRC[c][x][y] acquired by the image acquisition section 1011. A vehicle in the image data has a substantially rectangular shape where the vehicle's opposite ends are right and left sides, the roof is the top side, and the line of a shadow or a bumper is the bottom side.

First, the vehicle external shape detection section 1021 detects the vertical edges of the vehicle's opposite ends, which makes vertical lines of the rectangle. More specifically, as shown in FIG. 2(*b*), the section detects only the edges in the vertical direction from a light and shade image. Next, in order to acquire a distribution of the vertical edges, as shown in FIG. 2(*c*), the section determines a window region 201 having a possibility of existence of a vehicle, projects the edges on the X axis, thereby acquiring a histogram 202. Vertical edges should be concentrated at the vehicle's opposite ends. Accordingly, as shown in FIG. 2(*d*), the vehicle external shape detection section 1021 identifies two peaks having equivalent heights in the histogram 202 as the vehicle's opposite ends 203*a* and 203*b*.

Next, as shown in FIG. 2(*e*), the vehicle external shape detection section 1021 searches for a part where a lateral edge is continuous between the vehicle's opposite ends 203*a* and 203*b*, from the bottom of the screen, and regards this part as a vehicle's bottom 204.

The ratio of width and height of the vehicle is determined to a certain extent. Accordingly, the section determines a top 205 at a prescribed distance above the bottom 204 of the vehicle (e.g. a distance which is 0.8-fold of the distance between the opposite ends). The vehicle external shape detection section 1021 thus determines the vehicle candidate region 206, as shown in FIG. 2(*f*).

Concerning the detected vehicle external shape, the coordinate values of the top, bottom, left and right ends in the image are stored as the vehicle external shape ROI1[i](SX, SY, EX, EY).

[Vehicle Taillight Detection Section 1031]

Figure 3:
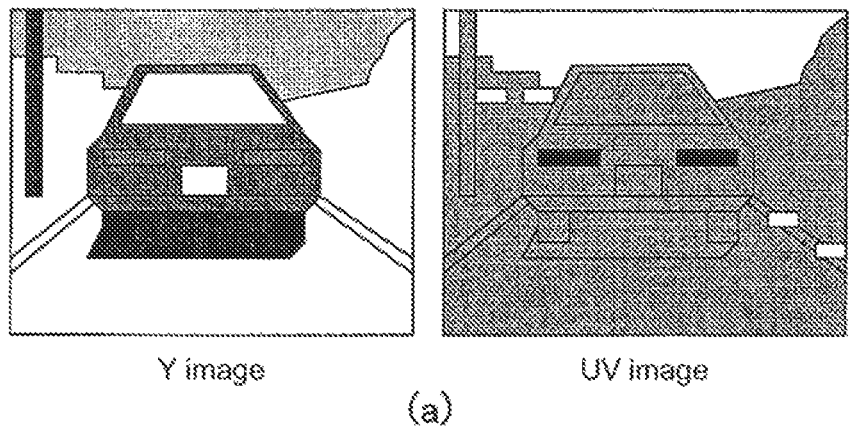
FIG. 3 is a schematic diagram used for describing the vehicle taillight detection section in the first embodiment.
Figure 3:
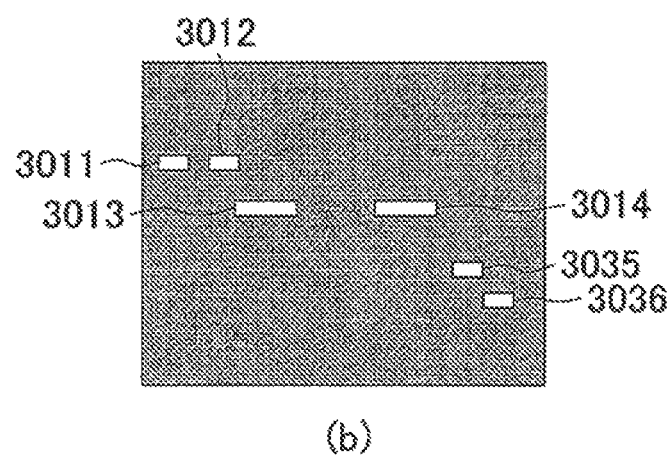
Figure 3:
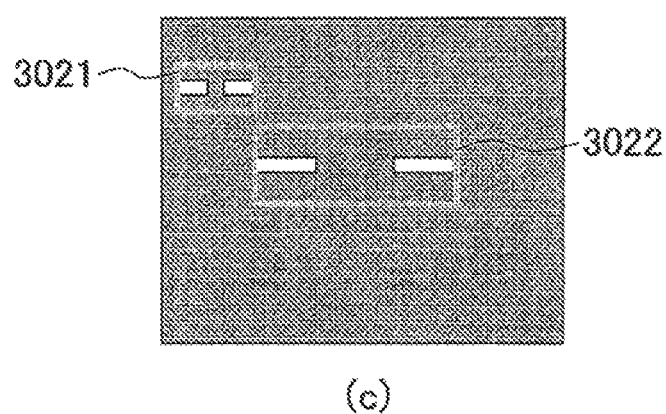

Next, referring to FIG. 3, the details of the process in the vehicle taillight detection section 1031 will be described. FIG. 3 shows an example of the process executed by the vehicle taillight detection section 1031.

First, the vehicle taillight detection section 1031 generates a binary image in which a red region in the image has been extracted, using a UV component of the image IMGSRC[c][x][y] acquired by the image acquisition section 1011. The IMGSRC[c][x][y] is searched on a pixel-by-pixel basis; if the pixel satisfies a criterion of the red region, the value of one is selected, and, if not, the value of zero is selected, thereby forming the binary image. The taillights of various vehicles are preliminarily imaged by the camera 1010 in various environments, and the distributions of a U component and a V component of the taillight region are manually acquired. The distribution is used as the criterion of the red region. More specifically, the Mahalanobis distance is adopted using the average and the variance of the distribution in the preliminarily acquired UV space. Instead, the U range and the V range are acquired so as to include the distributions, and a threshold process is executed. After generation of the binary image, the section executes a labeling process and extracts the region. FIG. 3(*b*) shows the extracted result. As a result of the extraction, regions other than the taillights of a vehicle are often extracted, as with reference numerals 3035 and 3036.

Next, the vehicle taillights are selected using the relationship of the extracted regions. The taillights of a vehicle are attached symmetrically with respect to the vehicle. Accordingly, it can be considered that a pair of regions having the heights and sizes of the extracted regions similar to each other are vehicle taillights. FIG. 3(*c*) shows a result of paired regions having the same height in the Y coordinate and the same size in the image of FIG. 3(*b*). A pair of regions 3021 and 3022 is extracted.

Concerning the detected vehicle taillight, the coordinate values of the top, bottom, left and right ends in the image are stored as vehicle taillight ROI2[j](SX, SY, EX, EY).

[Vehicle Pattern Detection Section 1041]

Figure 4:
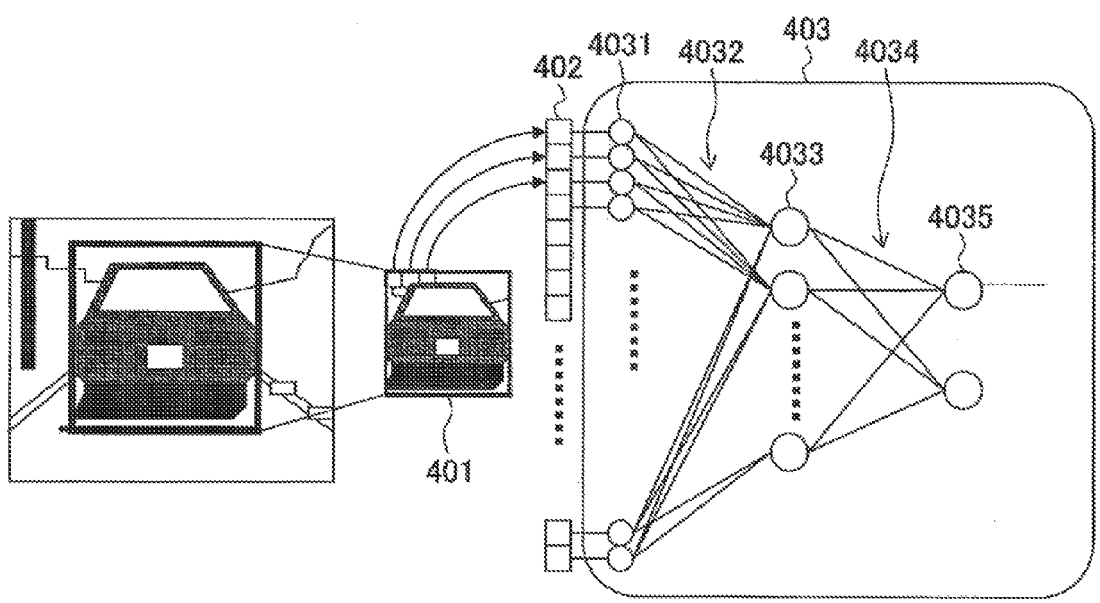
FIG. 4 is a schematic diagram used for describing the vehicle pattern detection section in the first embodiment.

Next, referring to FIG. 4, the details of the process executed by the vehicle pattern detection section 1041 will be described. FIG. 4 shows an example of a process executed by the vehicle pattern detection section 1041.

This process is executed on each vehicle external shape ROI1[i](SX, SY, EX, EY).

First, on a certain vehicle external shape ROI1[i](SX, SY, EX, EY), an image in the region is captured from the image IMGSRC[c][x][y]. The captured image may be both a Y image and a UV image, or only the Y image. This embodiment describes the case of capturing only the Y image.

Next, the image is reduced to a certain size to thereby generate a reduced image 401. In this embodiment, reduction is performed to an image having 16 pixels in width and 12 pixels in height.

The pixels of the reduced image are raster-scanned to generate a one-dimensional vector 402, which serves as an input into a neural network 403.

The neural network 403 simulates a network in a human brain. In the network there are an input layer 4031, an intermediate layer 4033, and output layer 4035 that include a plurality of nodes. A weight coefficient is assigned between each node of the input layer 4031 and each node of the intermediate layer 4033. Furthermore, a weight coefficient is assigned between each node of the intermediate layer 4033 and each node of the output layer 4035. An output of the neural network is one value of a node on the output layer. This value is acquired by a product-sum operation on the values of all the nodes on the intermediate layer 4033 connected to this node and the corresponding weight coefficients. Furthermore, the value of each node on the intermediate layer 4033 is acquired by a product-sum operation on the values of all the nodes on the input layer connected to this node and the corresponding weight coefficients.

In the vehicle pattern detection section 1041, the one-dimensional vector 402 is connected as it is to the input layer. Accordingly, the value of each node on the output layer can be calculated by the aforementioned process. As a result, if the value of a prescribed node on the output layer exceeds a threshold, it is determined that a vehicle pattern exists.

The prescribed node on the output layer is required to be determined when a program is preliminarily composed. The weight coefficients between the nodes are required to be preliminarily adjusted such that, when a pattern of a vehicle is input into the input node, the output of the node on the output layer exceeds the threshold, and, when a pattern other than a vehicle is input, the output is less than or equal to the threshold. The adjustment method may be a backpropagation method or the like, which is a publicly-known technique.

The detection result is transmitted to the first vehicle determination section 1051. Among the vehicle external shapes ROI1[i](SX, SY, EX, EY), a region determined as a vehicle is registered as the vehicle candidate VCL1[k](SX, SY, EX, EY).

[Second Vehicle Determination Section 1061]

Figure 5:
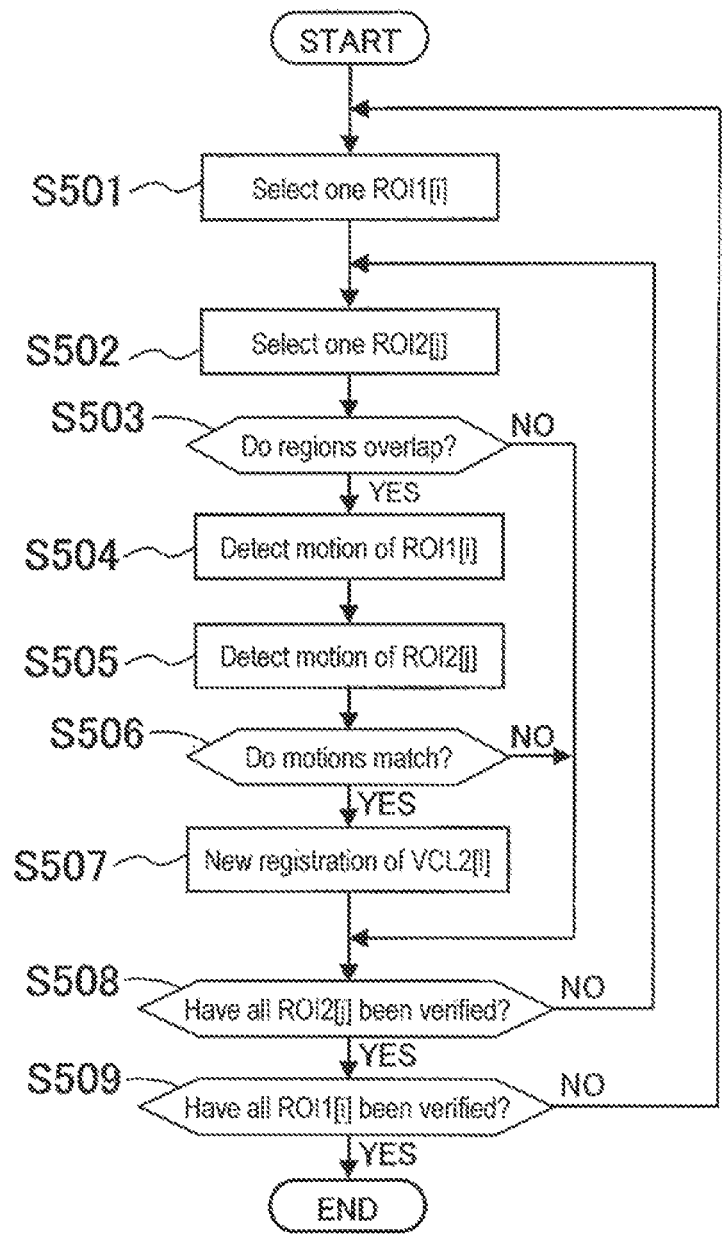
FIG. 5 is a flowchart showing an example of processing procedures executed by the second vehicle determination section in the first embodiment.

Next, referring to FIG. 5, the details of the process executed by the second vehicle determination section 1061 will be described. FIG. 5 is a flowchart showing an example of processing procedures executed by the vehicle determination section 1061.

First, in step S501, one vehicle external shape ROI1[i](SX, SY, EX, EY) is selected.

Next, in step S502, one vehicle taillight ROI2[j](SX, SY, EX, EY) is selected.

In step S503, it is determined whether the vehicle external shape ROI1[i](SX, SY, EX, EY) and the vehicle taillight ROI2[j](SX, SY, EX, EY) overlap with each other or not. If the regions overlap, the processing proceeds to step S504. If the regions do not overlap, the processing proceeds to step S508.

The determination of overlapping may be, for instance, a method of verifying presence or absence of overlapping using the top, bottom, left and right ends SX, SY, EX, EY in the image.

In step S504, the motion of ROI[i] is detected. The motion may be acquired using an amount of variation from what is nearest to the current external shape on the basis of a one-frame-preceding external shape detection result. Instead, an optical flow may be calculated in the vehicle external shape ROI[i](SX, SY, EX, EY), and the motion may be calculated from the average value of the flow. Thus, a motion vector (VX1, VY1) of ROI[i] is calculated.

In step S505, the motion of ROI2[j] is detected. The motion may be acquired using the amount of variation from what is nearest to the current taillight on the basis of a one-frame-preceding taillight detection result. Instead, an optical flow may be calculated in the vehicle taillight ROI2[j](SX, SY, EX, EY), and the motion may be calculated from the average value of the flow. Thus, a motion vector (VX2, VY2) of ROI2[j] is calculated.

In step S506, it is determined whether the object is identical or not using the directions and magnitude of the motions. If the motions match, the processing proceeds to step S507. If the motions do not match, the processing proceeds to step S508. For instance, the determination may be made using whether (VX1−VX2)^2+(VY1−VY2)^2 is less than or equal to a prescribed threshold or not, from the motion vector (VX1, VY1) of ROI1[i] and the motion vector (VX2, VY2) of ROI2[j].

In step S507, the detected region is newly registered as the second vehicle region VCL2[l].

In step S508, it is determined whether all the ROI2[j] have been verified or not. If verified, the processing proceeds to S509. If not, the processing returns to S502.

In step S509, it is determined whether all the ROI1[i] have been verified or not. If verified, the processing is finished. If not, the processing returns to S501.

[Determination and Selection Section 1071]

Next, the details of the process executed by the determination and selection section 1071 will be described.

Two cases will hereinafter be described. In one of the two cases, the determination and selection section 1071 uses the environment determination section 1111. In the other case, the determination and selection section 1071 does not use the environment determination section 1111. First, the case of using the environment determination section 1111 will be described.

An illumination around the own vehicle is estimated, using a sensor input acquired from the environment determination section 1111, and a value measured from the aforementioned image. The outputs of the environment determination section 1111 are preliminarily measured in various environments, and a table is created that associates actual illuminations with the respective outputs of the environment determination section 1111 at the times. This allows an actual illumination to be estimated from an output of the environment determination section 1111.

Next, it is determined how to use the results of the first vehicle candidate VCL1[k] and the second vehicle candidate VCL2[l] according to the illumination. Likewise, as shown in FIG. 6, a table is preliminarily created while the actual environments are verified under various illuminations.

Next, the case without use of the environment determination section 1111 will be described.

In this case, the current situation is estimated using the total number I of vehicle external shapes ROI1[i], the total number J of vehicle taillights ROI2[j], the total number K of first vehicle candidates VCL1[k], and the total number L of second vehicle candidates VCL2[l], which are integrations of data for the past few minutes.

For instance, if I<<J, it can be estimated as the night. If I>>J, it can be estimated as the daytime. If I>K, it can be estimated as the dusk.

It is determined how to use the results of the first vehicle candidate VCL1[k] and the second vehicle candidate VCL2[l], from thus estimated situation, using the table as shown in FIG. 6.

The one selected here is output as the vehicle VCL[m].

As described above, use of the embodiment of the present invention allows automatic switching to the optimal detection result, even in a scene, such as the dusk, that conventional schemes cannot support, while maintaining the detection results in the daytime and the night.

Accordingly, detection results applicable to alarm/control can be output in a scene, such as the dusk, which is in an illumination condition different from a typical condition. This allows the application range of the system in the dusk to be enlarged.

Second Embodiment

Figure 7:
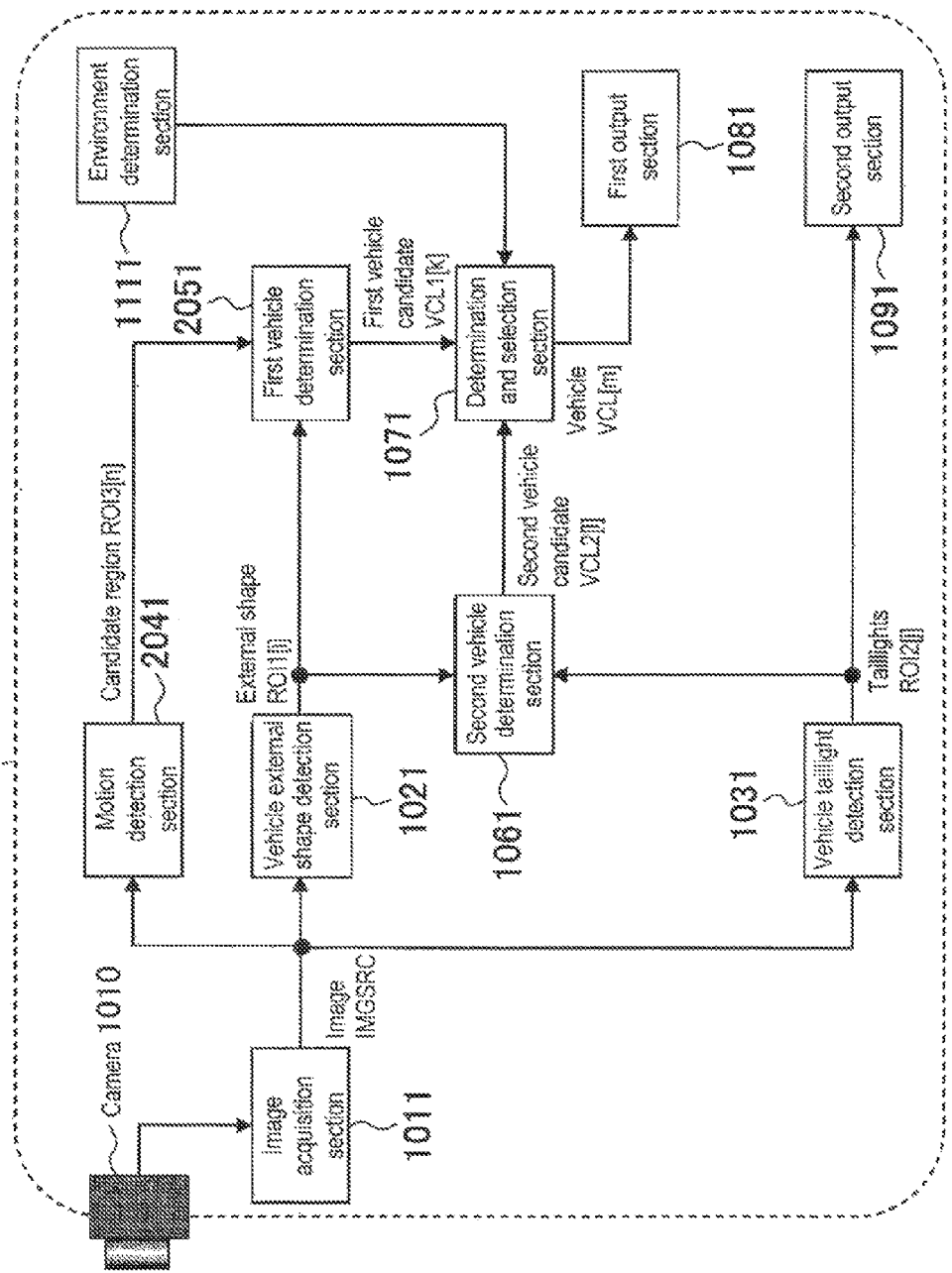
FIG. 7 is a functional block diagram showing a second embodiment of the environment recognizing device for a vehicle according to the present invention.

Next, a second embodiment of an environment recognizing device for a vehicle of the present invention will be described with reference to FIG. 7. FIG. 7 is a functional block diagram showing the environment recognizing device for a vehicle 2000 of the second embodiment. Hereinafter, portions different from those of the aforementioned environment recognizing device for a vehicle 1000 of the first embodiment will be described in detail. Analogous portions are assigned with the identical numerals. The description thereof is omitted.

The environment recognizing device for a vehicle 2000 is embedded in the vehicle-mounted camera 1010, the integrated controller or the like, and for detecting a vehicle from an image taken by the camera 1010. In this embodiment, this device is configured so as to detect a preceding vehicle from a taken image in front of the own vehicle.

The environment recognizing device for a vehicle 2000 includes a main part, which is a computer having a CPU, memory and IO. Prescribed processes are programmed therein. This device repeatedly executes the processes at a predetermined period. As shown in FIG. 7, the environment recognizing device for a vehicle 2000 includes the image acquisition section 1011, the vehicle external shape detection section 1021, the vehicle taillight detection section 1031, the motion detection section 2041, the first vehicle determination section 2051, the second vehicle determination section 1061, the determination and selection section 1071, the first output section 1081 and the second output section 1091. In some embodiments, this device further includes the environment determination section 1111.

[Motion Detection Section 2041]

The motion detection section 2041 analyzes the motion using the image IMGSRC[c][x][y] acquired by the image acquisition section 1011 and a one-frame-preceding image, extracts a region including a motion different from the background, and outputs a candidate region ROI3[n].

Figure 8:
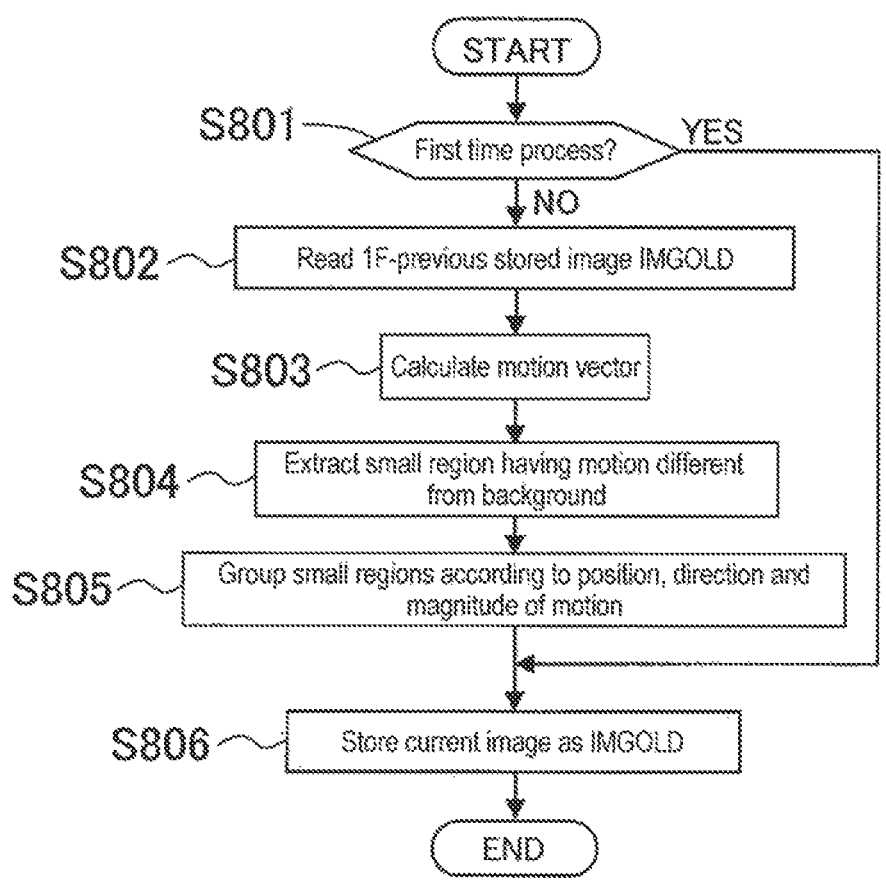
FIG. 8 is a flowchart showing an example of processing procedures executed by the motion detection section in the second embodiment.

Hereinafter, referring to FIG. 8, the details of the process executed by the motion detection section 2041 will be described. FIG. 8 is a flowchart showing an example of processing procedures executed by the motion detection section 2041.

First, in step S801, it is determined whether the process is the first time or not. If the process is the first time, no previous image for detecting the motion exists and thereby the processing proceeds to step S806. If the process is not the first time, the processing proceeds to step S802.

Next, in step S802, the one-sample previous image IMGOLD[c][x][y] stored by the preceding process is read.

Figure 9:
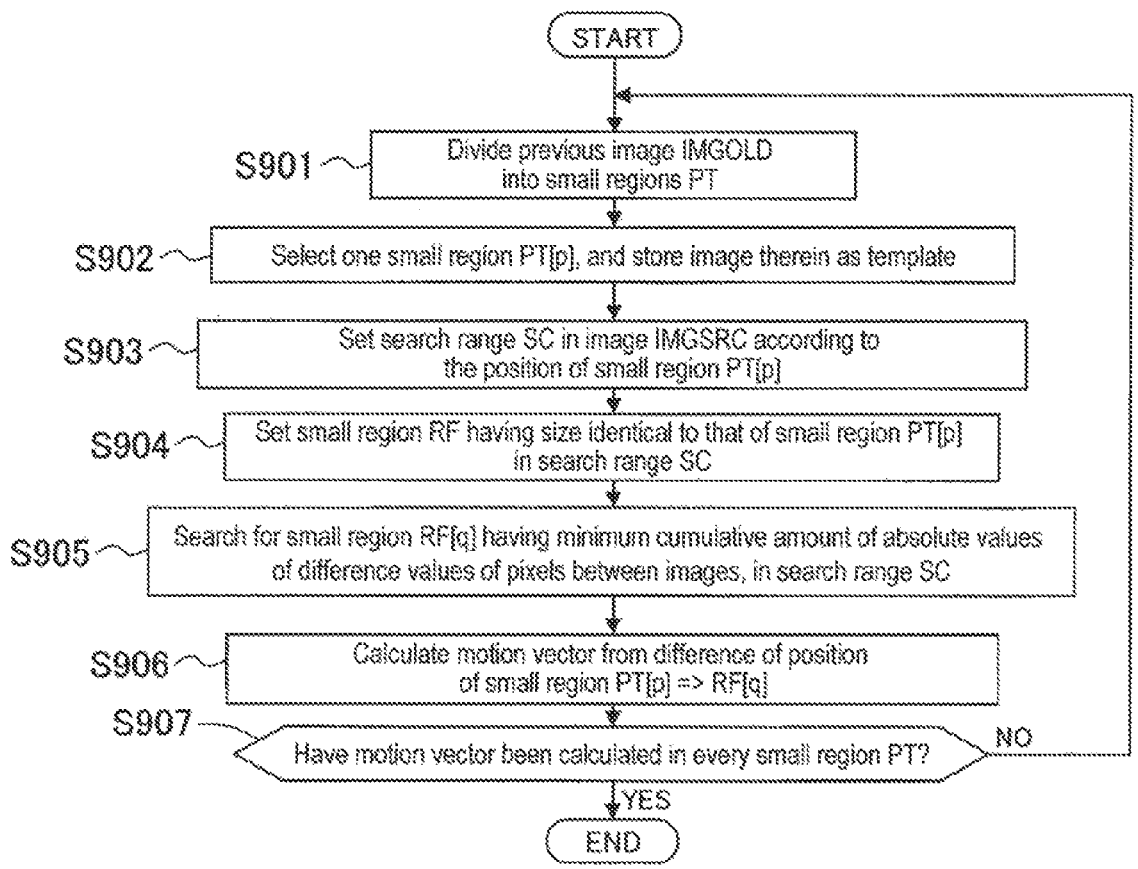
FIG. 9 is a flowchart showing an example of a detailed configuration of a part of a motion detection process in step 803 in the flowchart of FIG. 8.

In step S803, the motion vector is calculated using the image IMGSRC[c][x][y] and the previous image IMGOLD[c][x][y]. The motion vector calculation process is a process of calculating to what position in one image the pixels in another image has moved. A gradient method and a block matching method have been known as the method. In this embodiment, a calculation method of the block matching method will be described with reference to FIG. 9.

First, in step S901, the previous image IMGOLD[c][x][y] is divided into small regions PT[p].

Next, in step S902, one small region PT[p] is selected, and the image pattern in the region is stored as a template.

In step S903, a search range SC is set in the image IMGSRC[c][x][y] according to the position of the small region PT[p]. For instance, the search range SC is set as a range that is centered at the same center of the small region PT[p] and extended by a preset prescribed value, or a range that is centered at the point on which the motion is predicted from the point identical to that of the small region PT[p] using the vehicle velocity of the own vehicle and extended by a preset prescribed value.

Next, in step S904, a reference small region RF[q] having the size identical to that of the small region PT[p] is set. For instance, the reference small region RF[q] is arranged so as to be spread out in the search range SC while overlapping, or arranged in a thinned-out manner.

In step S905, the cumulative total of absolute values of differences between pixels of the image is calculated on combinations of one small region PT[p] and a plurality of reference small regions RF[q], and a RFMIN[q] having the minimum value is acquired.

Next, in step S906, a motion vector (VX[p], VY[p]) is calculated from the difference between the positions of the PT[p] and the reference small region RFMIN[q].

In step S907, it is determined whether the process has been executed on all the small regions PT[p]. If the process has been executed, the processing is finished. If the process has not been completed, the processing proceeds to step S901.

The above process allows the motion vector (VX[p], VY[p]) in each small region PT[p] in the image to be calculated.

Description is returned to that on FIG. 8. After the motion vector is calculated by the aforementioned process in step S803, a small region having a motion different from the background is extracted in step S804. The motion of the vehicle is predicted using the vehicle velocity, the steering angle and the yaw rate of the own vehicle, and it is assumed that every object captured in the image is a road surface. It can then be predicted where a point on the image moves in the next frame. Thus, on the assumption that each small region PT[p] is a plane, the movement amount (VXE[p], VYE[p]) is predicted, and a region having a large difference between the movement amount and the motion vector (VX[p], VY[p]) observed from the image is extracted. For instance, a criterion is adopted that is the case where (VXE[p]−VX[p])^2+(VYE[p]−VY[p])^2 exceeds the threshold TH.

Next, in step S805, the extracted small regions are grouped using the positions, the directions and magnitudes of motions of these regions, thereby acquiring the candidate region ROI3[n]. For instance, the grouping is performed by searching the small regions for the small region that abuts to another small region and has differences in direction and magnitude of the motion vector within prescribed thresholds.

[First Vehicle Determination Section 2051]

Next, a process executed by the first vehicle determination section 2051 will hereinafter be described.

First, referring to FIG. 10, the details of the process in the first vehicle determination section 2051 will be described.

Figure 10:
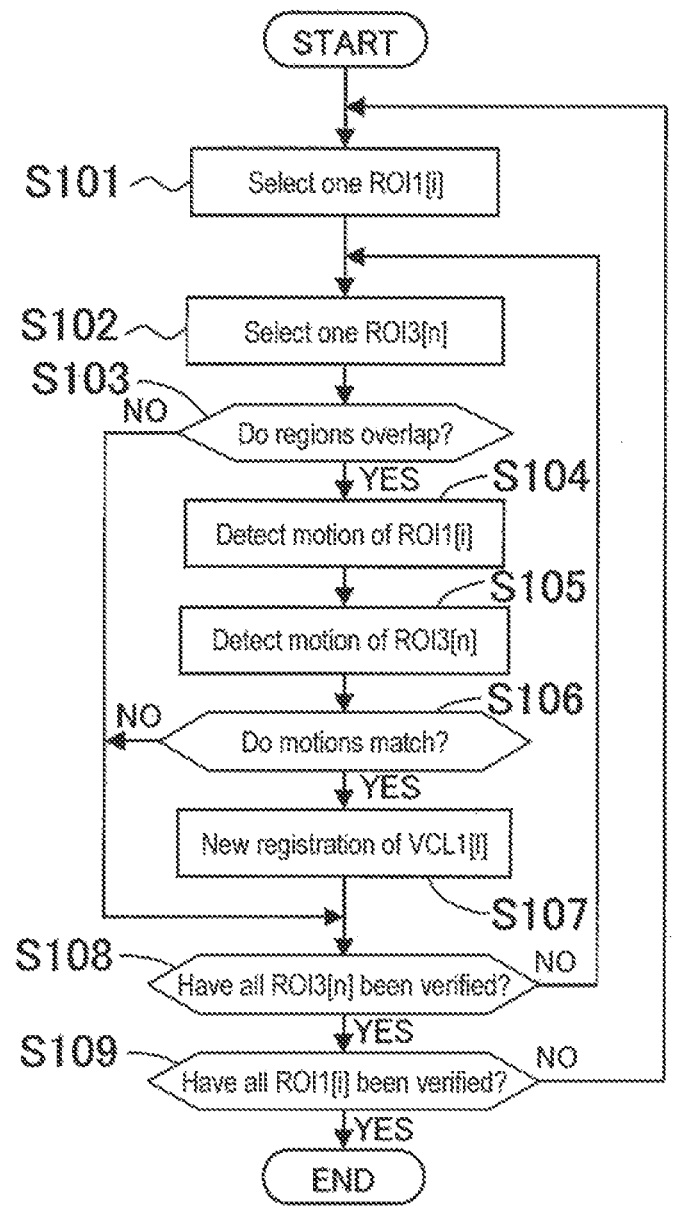
FIG. 10 is a flowchart showing an example of processing procedures of the first object determination section in the second embodiment.

FIG. 10 is a flowchart showing an example of processing procedures executed by the first vehicle determination section 2051.

First, in step S101, one vehicle external shape ROI1[i](SX, SY, EX, EY) is selected.

Next, in step S102, one candidate region ROI3[n] (SX, SY, EX, EY) is selected.

In step S103, it is determined whether the vehicle external shape ROI1[i] (SX, SY, EX, EY) overlaps with the candidate region ROI3[n](SX, SY, EX, EY) or not. If the regions overlap, the processing proceeds to step S104. If the regions do not overlap, the processing proceeds to step S108. The overlap is determined by, for instance, whether at least a prescribed area overlaps or not using the top, bottom, left and right ends SX, SY, EX, EY in the image.

In step S104, the motion of ROI1[i] is detected. The motion may be acquired using the amount of variation from what is nearest to the current external shape on the basis of a one-frame-preceding external shape detection result. Instead, an optical flow may be calculated in the vehicle external shape ROI1[i](SX, SY, EX, EY), and the motion may be calculated from the average value of the flow. Thus, a motion vector (VX1, VY1) of ROI1[i] is calculated.

In step S105, the motion of the candidate region ROI3[n] is detected. The motion may be acquired using the amount of variation from what is nearest to the current motion region on the basis of a one-frame-preceding motion detection result. Since the candidate region ROI3[n](SX, SY, EX, EY) is acquired from the optical flow, the motion may be calculated from the average value of the flow. Thus, the motion vector (VX3, VY3) of the candidate region ROI3[n] is calculated.

In step S106, it is determined whether the object is identical or not using the direction and magnitude of the motion. If the motions match, the processing proceeds to step S107. If the motions do not match, processing proceeds to step S108. For instance, the determination may be made using whether (VX1−VX3)^2+(VY1−VY3)^2 is less than or equal to a prescribed threshold or not, from the motion vector (VX1, VY1) of ROI1[i] and the motion vector (VX3, VY3) of ROI3[n].

In step S107, the detected region is newly registered as the first vehicle region VCL1[l].

In step S108, it is determined whether all the ROI3[n] have been verified or not. If verified, the processing proceeds to S109. If not, the processing returns to S102.

In step S109, it is determined whether all the ROI1[i] have been verified or not. If verified, the processing is finished. If not, the processing returns to S101.

Third Embodiment

Figure 11:
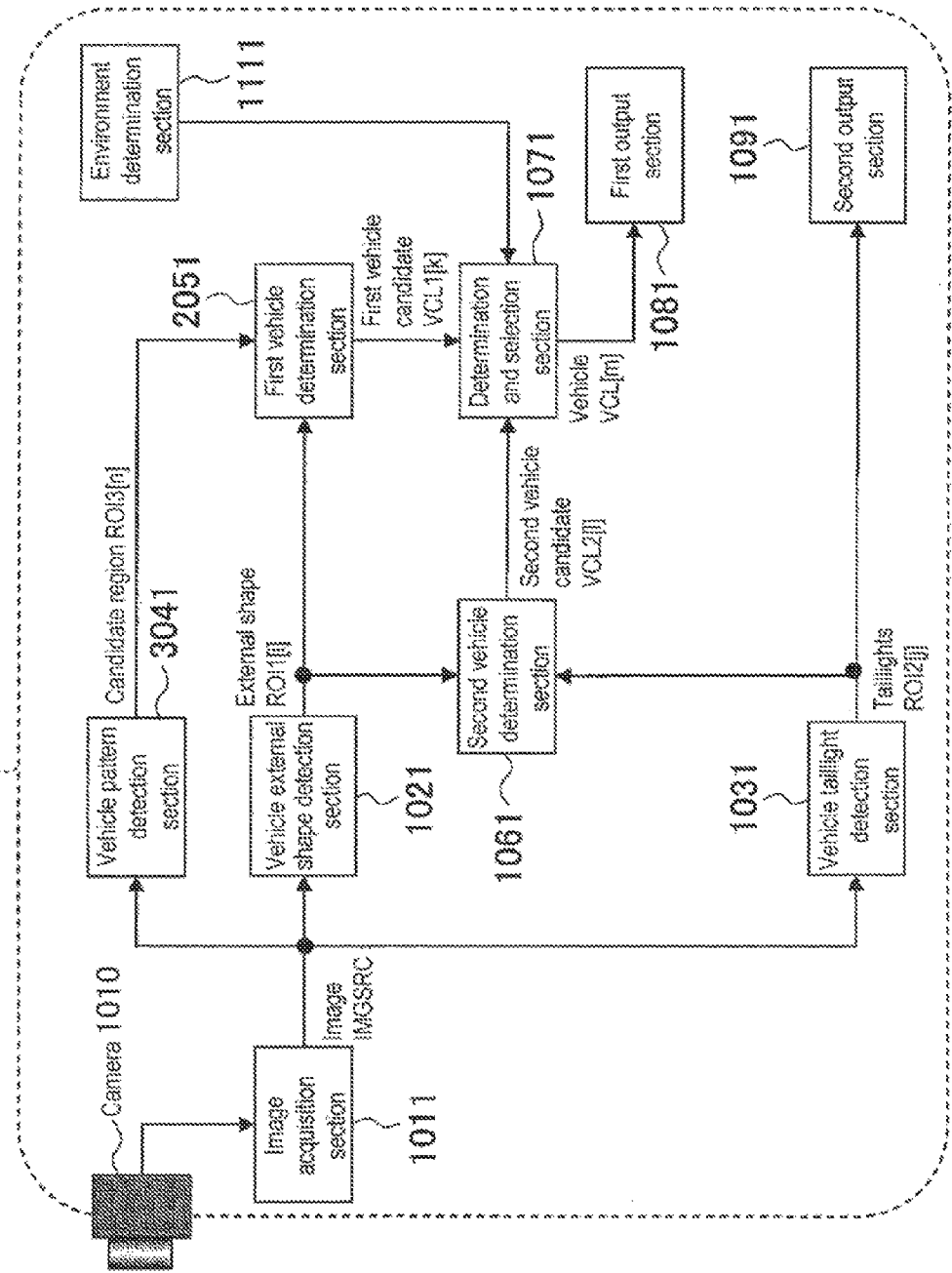
FIG. 11 is a functional block diagram showing a third embodiment of the environment recognizing device for a vehicle according to the present invention.

Next, a third embodiment of an environment recognizing device for a vehicle of the present invention will be described with reference to FIG. 11. FIG. 11 is a functional block diagram showing the environment recognizing device for a vehicle 3000 of the third embodiment. Hereinafter, only portions different from those of the environment recognizing device for a vehicles 1000 and 2000 will be described in detail. Analogous portions are assigned with the identical numerals. The description thereof is omitted.

The environment recognizing device for a vehicle 3000 is embedded in the vehicle-mounted camera 1010, an integrated controller or the like, and for detecting a vehicle from an image taken by the camera 1010. In this embodiment, this device is configured so as to detect a preceding vehicle from a taken image in front of the own vehicle.

The environment recognizing device for a vehicle 3000 includes a main part, which is a computer having a CPU, memory and I/O. Prescribed processes are programmed therein. This device repeatedly executes the processes at a predetermined period. As shown in FIG. 11, the environment recognizing device for a vehicle 3000 includes the image acquisition section 1011, the vehicle external shape detection section 1021, the vehicle taillight detection section 1031, the vehicle pattern detection section 3041, the first vehicle determination section 2051, the second vehicle determination section 1061, the determination and selection section 1071, the first output section 1081, and the second output section 1091. In some embodiments, this device further includes the environment determination section 1111.

[Vehicle Pattern Detection Section 3041]

The vehicle pattern detection section 3041 executes a pattern matching process on the image IMGSRC[c][x][y] acquired by the image acquisition section 1011, thereby outputting the candidate region ROI3[n].

The vehicle pattern detection process described with reference to FIG. 4 is executed on the vehicle external shape ROI1[i]. In this embodiment, the process is repeatedly executed on the entire image while the coordinates (x, y) and the size (s) in the image are changed. The process is executed such that, for instance, the entire image is searched thoroughly, or that only neighborhood of the vanishing point is searched using a camera geometric model as the size becomes smaller, or that the region is limited using the vehicle velocity, the steering angle and the yaw rate of the own vehicle.

The process of the first vehicle determination section using the candidate region ROI3[n] and the vehicle external shape ROI1[i] that are acquired as the result is substantially identical to those of the aforementioned first vehicle determination section 2051. Accordingly, description thereof is omitted.

<Vehicle Control System>

Next, referring to FIGS. 12 to 14, an example of a vehicle control system using the environment recognizing device for a vehicle described in the embodiment will be described.

Figure 12:
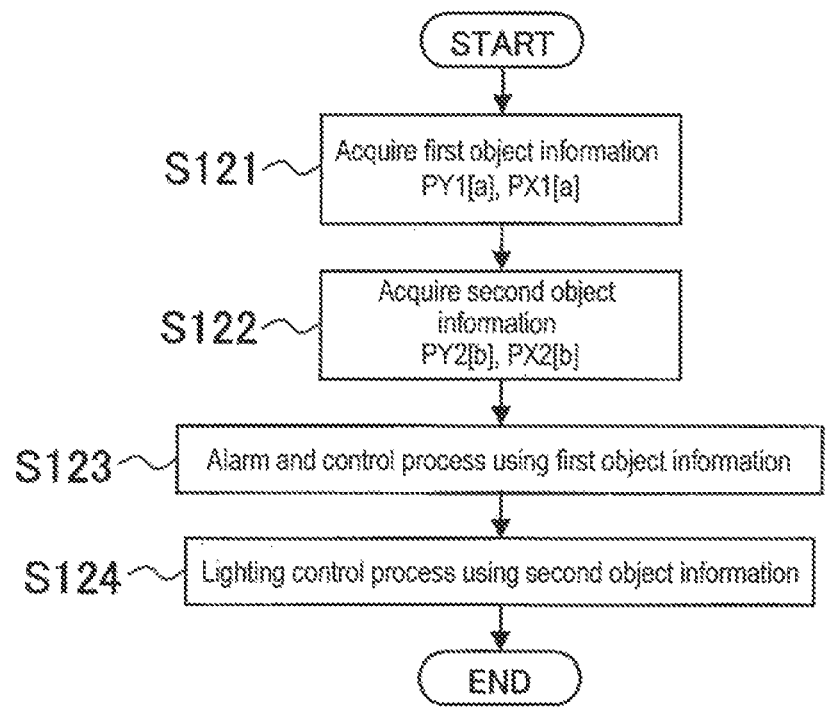
FIG. 12 is a flowchart showing an example of processing procedures of a vehicle control system using the environment recognizing device for a vehicle of the present invention.

FIG. 12 is a flowchart showing an example of a basic operation of the vehicle control system.

First, in step S121, the first object information is acquired by the first output section 1081 of the aforementioned environment recognizing device for a vehicle. This example adopts the distance PY1[a] and the lateral position PX1[a] to the vehicle that are calculated from the image information of the vehicle detected by the environment recognizing device for a vehicle using the camera geometry.

Likewise, in step S122, second object information is acquired by the second output section 1091 of the aforementioned environment recognizing device for a vehicle. This embodiment adopts the distance PY2[b] and the lateral position PX2[b] to the vehicle that are calculated from the image information of the vehicle detected by the environment recognizing device for a vehicle using the camera geometry.

Next, in step S123, a pre-crash safety system (alarm and control process) is operated using the first object information. The details of the operation will be described later.

In step S124, a lighting control process is executed using the second object information. The details of the operation will be described later.

[Alarm and Control Process]

Hereinafter, referring to FIGS. 13 and 14, a vehicle control system will be described that issues an alarm and automatically controls the brakes according to a preceding vehicle determined by the aforementioned embodiments.

Figure 13:
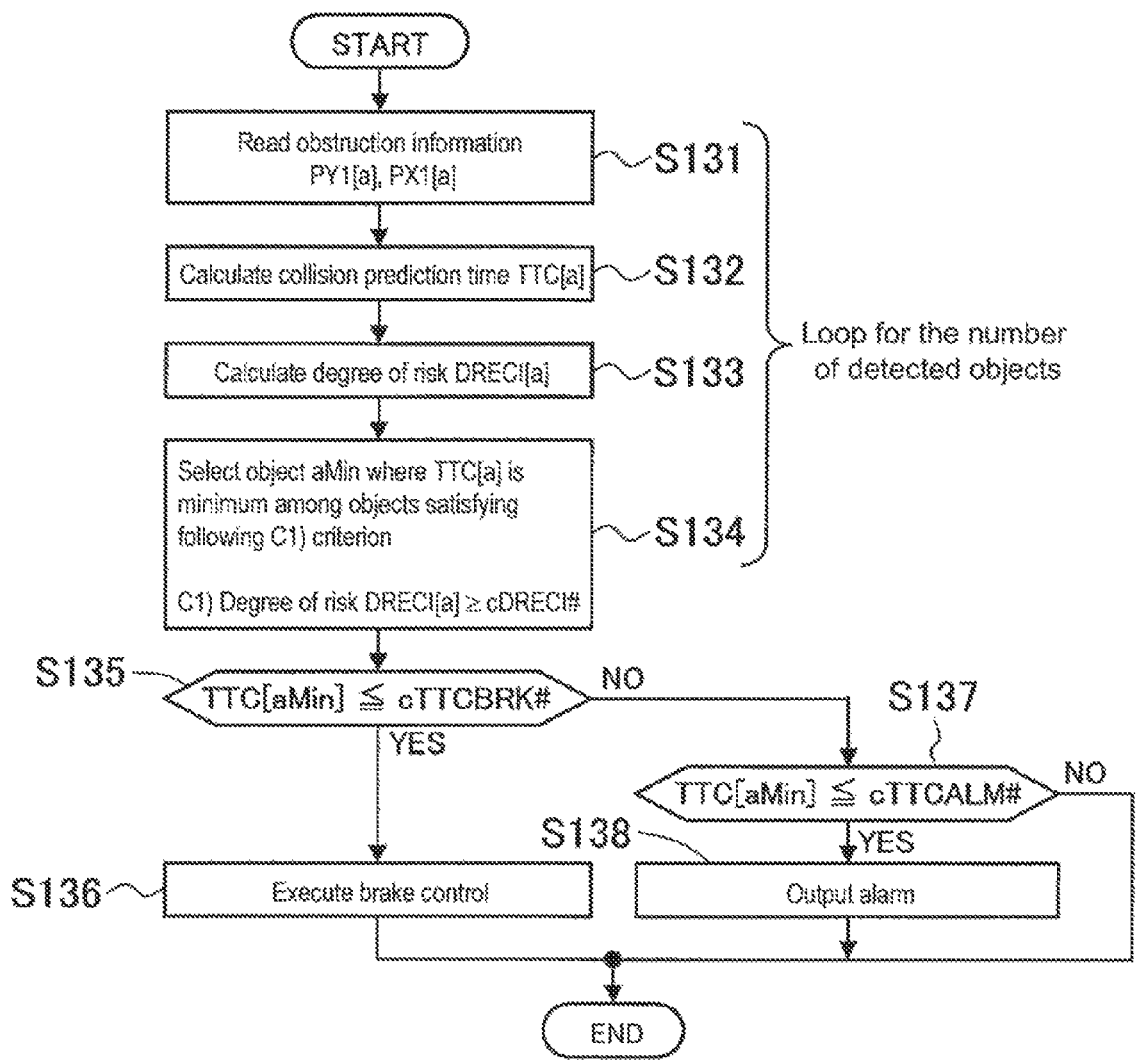
FIG. 13 is a flowchart showing another example of the processing procedures of the vehicle control system using the environment recognizing device for a vehicle of the present invention.
Figure 14:
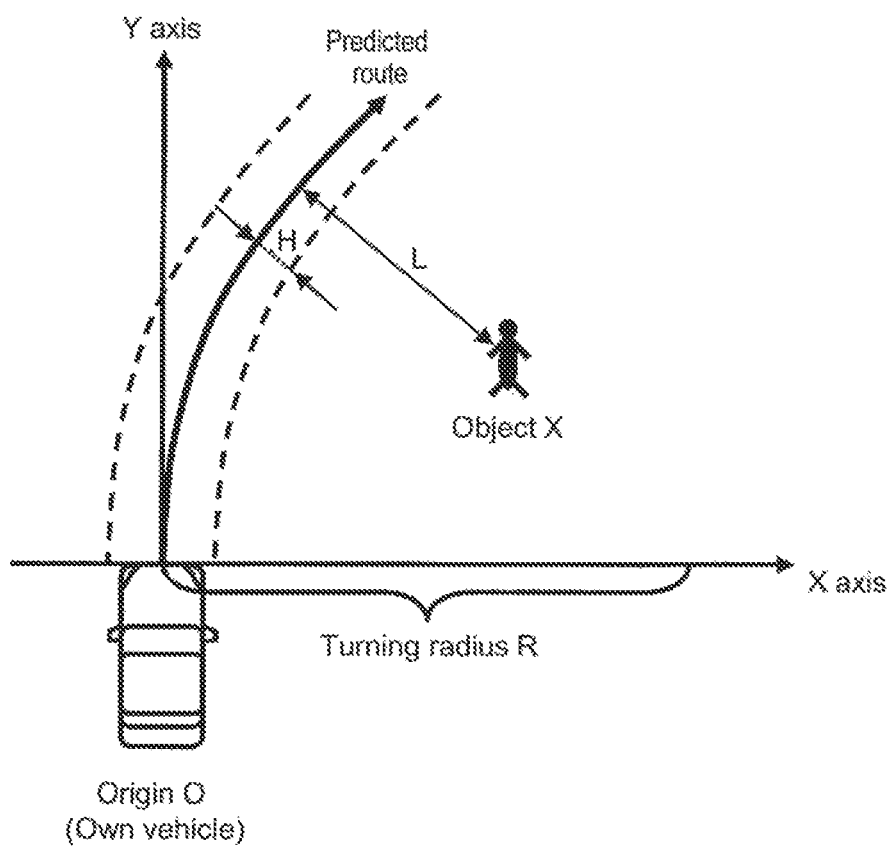
FIG. 14 is a schematic diagram used for describing calculation of a degree of risk in the vehicle control system using the environment recognizing device for a vehicle of the present invention.

FIG. 13 is a flowchart showing processing procedures of the pre-crash safety system.

First, in step S131, obstruction information (PY1[a], PX1[a]) is read.

Next, in step S132, a collision prediction time TTC[a] of each detected object is computed using Expression (1). Here, a relative velocity VY1[a] is acquired by pseudo-differentiating the relative distance PY1[a] of the object.

$$TTC[a]=PY1[a]/VY1[a] \quad (1)$$

Furthermore, in step S133, the degree of risk DRECI[a] for each obstruction is computed.

Hereinafter, an example of a method of computing the degree of risk DRECI[a] for the object X[a] detected by any of the environment recognizing devices for vehicles will be described with reference to FIG. 14.

First, a method of estimating a predicted route will be described. As shown in FIG. 14, provided that the position of the own vehicle is the origin O, the predicted route can be approximated with a circular arc having a turning radius R with the origin O. Here, the turning radius R is represented by Expression (2) using the steering angle α, velocity Vsp, stability factor A, wheelbase L and steering gear ratio Gs of the own vehicle.

$$R=(1+AV^2) \times (L \cdot Gs/\alpha) \quad (2)$$

The positive and negative signs of the stability factor determine the steering characteristics of the vehicle. This factor is an important value that is an index representing the magnitude of variation depending on the velocity of a stationary circular turning of the vehicle. It can be understood from Expression (2) that the turning radius R varies in proportion to a square of the velocity Vsp of the own vehicle with a stability factor A as a coefficient. The turning radius R can be represented by Expression (3) using the vehicle velocity Vsp and the yaw rate γ.

$$R = V/\gamma \quad (3)$$

Next, a perpendicular is drawn from the object X[a] to the center of the predicted route approximated with the circular arc having the turning radius R to thereby acquire the distance L[a].

Furthermore, the distance L[a] is subtracted from the width H of the own vehicle. If this value is negative, the degree of risk DRECI[a]=0. If this value is positive, the degree of risk DRECI[a] is calculated according to following Expression (4).

$$DRECI[a] = (H - L[a])/H \quad (4)$$

The processes in steps S131 to S133 have a configuration of loop processing according to the number of detected objects.

In step S134, the objects satisfying the criterion of Expression (5) are selected according to the degree of risk DRECI[a] calculated in step S133, the object aMin where the collision prediction time TTC[a] is the minimum is further selected among the selected objects.

$$DRECI[a] \geq cDRECI\# \quad (5)$$

Here, the prescribed value cDRECI# is a threshold for determining whether collision with the own vehicle occurs or not.

Next, in step S135, it is determined whether the object is in a range where the brakes are automatically controlled or not according to the collision prediction time TTC[aMin] of the selected object aMin. If Expression (6) is satisfied, the processing proceeds to step S136, the brake control is executed, and the processing is finished. If Expression (6) is not satisfied, the processing proceeds to step S137.

$$TTC[aMin] \leq cTTCBRK\# \quad (6)$$

In step S137, it is determined whether the object is in a range where an alarm is issued or not according to the collision prediction time TTC[aMin] of the selected object aMin. If Expression (7) is satisfied, the processing proceeds to step S138, an alarm is issued, and the processing is finished. If Expression (7) is not satisfied, the brake control and issuance of an alarm are not performed, and the processing is finished.

$$TTC[aMin] \leq cTTCALM\# \quad (7)$$

As described above, the alarm and brake control can be activated according to the degree of risk, on the object determined as a preceding vehicle by any of the aforementioned environment recognizing devices for vehicles 1000, 2000 and 3000 of the embodiments of the present invention.

[Lighting Control]

Next, a vehicle control system will be described that adjusts illumination intensities and the range of the headlights of the own vehicle according to the preceding vehicle determined in the aforementioned embodiment.

Figure 15A:
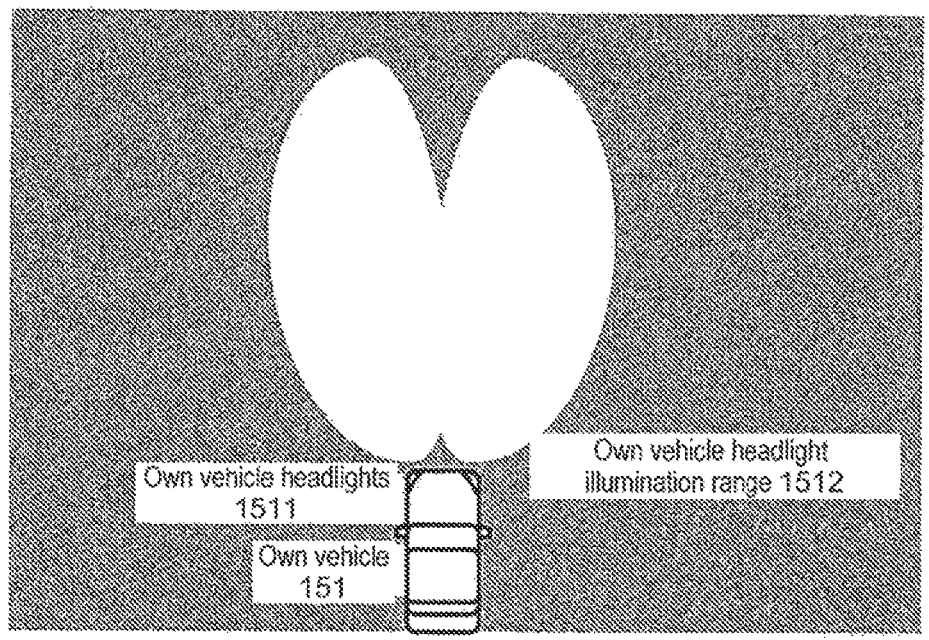
FIG. 15A is a schematic diagram used for describing a lighting control system using the environment recognizing device for a vehicle of the present invention.
Figure 15B:
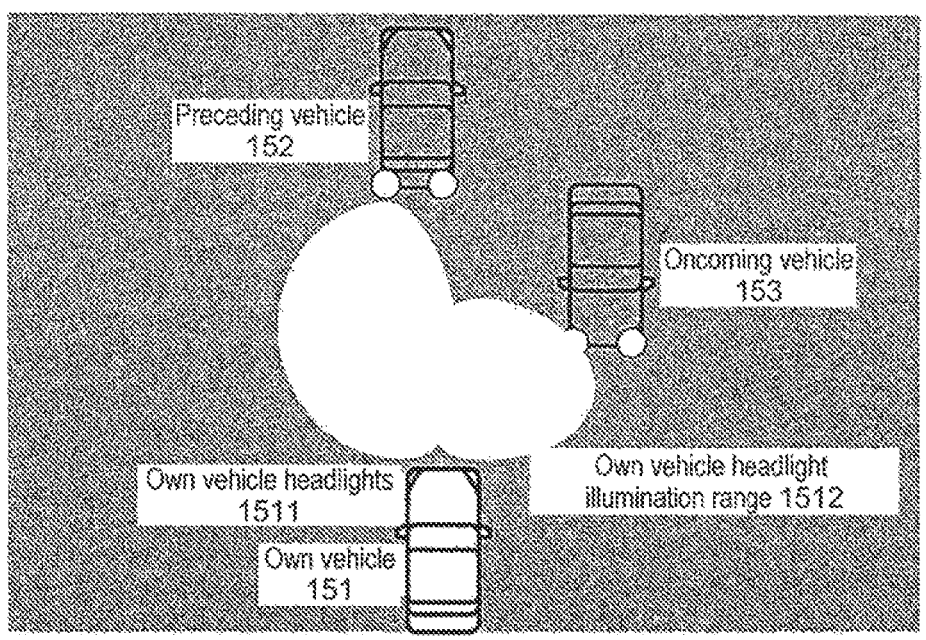
FIG. 15B is a schematic diagram used for describing a lighting control system using the environment recognizing device for a vehicle of the present invention

FIG. 15 is a diagram illustrating an operation of a lighting control process. The lighting control process controls headlights 1511 of the own vehicle and automatically adjusts the headlight illumination range 1512 of the own vehicle such that a low beam is selected for a region where a preceding vehicle or an oncoming vehicle exist, and a high beam is selected for the other regions. As shown in FIG. 15A, if a preceding vehicle and an oncoming vehicle do not exist, the headlight illumination range 1512 of the own vehicle is maximized. As shown in FIG. 15B, if a preceding vehicle or an oncoming vehicle exists, the headlight illumination range of the own vehicle is changed. The flow of the process will hereinafter be described.

First, the position (PY2[b], PX2[b]) of the preceding vehicle is read from the vehicle taillights detected by any of the aforementioned environment recognizing devices for vehicles.

Next, the position (PYH[h], PXH[h]) of the oncoming vehicle is read. White blips as candidates of headlights of an oncoming vehicle are detected from the image, and pair information thereof is utilized, thereby allowing an oncoming vehicle information to be detected. The details of a headlights detection process can be realized by another publicly-known technique. Accordingly, the description thereof is omitted here. Detection of the pair of the headlights in the image, in turn, allows the distance PYH[h], the lateral position PXH[h] to be detected using the camera geometry.

The headlights 1511 of the own vehicle are controlled to adjust the headlight illumination range 1512 such that the detected preceding vehicle 152 and the oncoming vehicle 153 are not illuminated with high beams, and the region without these vehicle is illuminated with high beams.

The control of the headlights 1511 includes, for instance, adjustment of the intensities of the light sources of the headlights 1511, and switching of illumination angles of the headlights 1511. In the case capable of switching the intensity of illumination of the headlights 1511 in a multi-step manner, the intensities of the beams are adjusted according to the distance nearest to the own vehicle among the distances PYH[h] to the oncoming vehicles 153 and the distances PY2[b] to the preceding vehicles 152.

In the case capable of adjusting the illumination range of the headlights 1511 according to the angle in the lateral direction, the leftmost vehicle and the rightmost vehicle are determined among the preceding vehicles and the oncoming vehicles according to the position (PYH[h], PXH[h]) of the oncoming vehicle and the position (PY2[b], PX2[b]) of the preceding vehicle, and adjustment is performed such that these ranges are illuminated with low beams and the outer ranges are illuminated with high beams.

As described above, use of the environment recognizing device for a vehicle in the embodiment of the present invention can activate an alarm and control in a scene, such as the dusk, which is under an illumination condition different from that in a typical condition.

The embodiments have described mainly four-wheeled vehicles. However, the description is analogously applicable to two-wheeled vehicles.

The present invention is not limited to the aforementioned embodiments. Instead, various modifications can be made within the scope without departing the gist of the present invention.

DESCRIPTION OF SYMBOLS

1000 environment recognizing device for a vehicle (first embodiment)
1010 camera
1011 image acquisition section
1021 vehicle external shape detection section
1031 vehicle taillight detection section
1041 vehicle pattern detection section
1051 first vehicle determination section
1061 second vehicle determination section
1071 determination and selection section
1081 first output section
1091 second output section 1111 environment determination section
2000 environment recognizing device for a vehicle (second embodiment)
2041 motion detection section
2051 first vehicle determination section
3000 environment recognizing device for a vehicle (third embodiment)
3041 vehicle pattern detection section

What is claimed is:

1. An environment recognizing device for a vehicle, comprising:
    an image acquisition section for acquiring an image taken around an own vehicle;
    a first vehicle candidate region detection section for detecting a vehicle candidate region from the image using image gradient information;
    a second vehicle candidate region detection section for detecting a vehicle candidate region from the image using image color information; and
    a vehicle determination section for determining presence or absence of a vehicle using the first vehicle candidate region and the second vehicle candidate region,
    wherein the vehicle determination section determines a region in which the first vehicle candidate region and the second vehicle candidate region overlap with each other and move in synchronization, as a vehicle.

2. An environment recognizing device for a vehicle, comprising:
    an image acquisition section for acquiring an image taken around an own vehicle;
    a first vehicle candidate region detection section for detecting a vehicle candidate region from the image using image gradient information;
    a second vehicle candidate region detection section for detecting a vehicle candidate region from the image using image color information;
    a third vehicle candidate region detection section for detecting a vehicle candidate region from the image according to a detection method different from the first vehicle candidate region detection section and the second vehicle candidate region detection section;
    a first vehicle determination section for determining presence or absence of a vehicle using the first vehicle candidate region and the third vehicle candidate region; and
    a second vehicle determination section for determining presence or absence of a vehicle using the first vehicle candidate region and the second vehicle candidate region,
    wherein the second vehicle determination section determines a region in which the first vehicle candidate region and the second vehicle candidate region overlap with each other and move in synchronization, as a vehicle.

3. An environment recognizing device for a vehicle, comprising:
    an image acquisition section for acquiring an image taken around an own vehicle;
    a first vehicle candidate region detection section for detecting a first vehicle candidate region from the image using image gradient information;
    a second vehicle candidate region detection section for detecting a second vehicle candidate region from the image using image color information;
    a third vehicle candidate region detection section for detecting a third vehicle candidate region by applying a required processing operation to the image;
    a first vehicle determination section for determining presence or absence of a vehicle using the first vehicle candidate region and the third vehicle candidate region;
    a second vehicle determination section for determining presence or absence of a vehicle using the first vehicle candidate region and the second vehicle candidate region;
    a determination and selection section for selecting any of the first vehicle candidate determined by the first vehicle determination section and the second vehicle candidate determined by the second vehicle determination section according to a situation at that time;
    a first output section for outputting a selection result of the determination and selection section, as a first output; and
    a second output section for outputting the second vehicle candidate region as a second output,
    wherein the second vehicle determination section determines a region in which the first vehicle candidate region and the second vehicle candidate region overlap with each other and move in synchronization, as a vehicle.

4. The environment recognizing device for a vehicle according to claim 3, wherein the first vehicle candidate region detection section detects an external shape of a vehicle, and the second vehicle candidate region detection section detects taillights of a vehicle.

5. The environment recognizing device for a vehicle according to claim 3, wherein the third vehicle candidate region detection section detects the third vehicle candidate region by determining presence or absence of a vehicle pattern according to a pattern matching process.

6. The environment recognizing device for a vehicle according to claim 5, wherein the third vehicle candidate region detection section executes a detection process on the first vehicle candidate region.

7. The environment recognizing device for a vehicle according to claim 3, wherein the third vehicle candidate region detection section detects the third vehicle candidate region using motion information of the image.

8. The environment recognizing device for a vehicle according to claim 3, further comprising an illumination determination section for determining illumination of an environment, wherein the determination and selection section selects any of the first vehicle candidate determined by the first vehicle determination section and the second vehicle candidate determined by the second vehicle determination section, according to an illumination determination result.

9. A vehicle control system, comprising:
    the environment recognizing device for a vehicle according to claim 3;
    a collision risk degree calculation section for calculating a degree of risk that the own vehicle will collide, according to the first output;
    a first control section for executing control for avoiding collision with the own vehicle, according to the degree of collision risk; and
    a second control section for executing control for improving visibility of a driver, according to the second output.

10. The vehicle control system according to claim 9, wherein the first control section executes control for issuing an alarm or control for activating a brake.

11. The vehicle control system according to claim 9, wherein the second control section executes control for adjusting an amount of light and/or an illumination range of a lighting device of the vehicle.

* * * * *